Patented Oct. 12, 1937

2,095,333

UNITED STATES PATENT OFFICE 2,095,333

AMMUNITION

John F. Hutchinson, Bridgeport, Conn., assignor to Remington Arms Company, Inc., a corporation of Delaware No Drawing. Application December 12, 1934, Serial No. 757,172

3 Claims. (Cl. 52—2)

This invention relates to binders or adhesives for ammunition priming compositions.

When priming compositions are charged into primer cups or rimfire shells in a moistened condition it is desirable that the composition be in the form of a paste of such a consistency and having such adhesive properties as will prevent its disintegration and cause it to properly adhere to the metal of the shell or primer cup. Since the ingredients of the composition are of crystalline character and do not absorb moisture, it is desirable to include a colloidal gum, binder or bodying agent, and for this purpose such gums as gum arabic and gum tragacanth have been extensively used. However, in the presence of certain priming mixture ingredients, such as lead nitrate, these gums are precipitated and fail to perform their function of giving the composition a pasty consistency.

The present invention comprises the discovery of a group of materials which are not precipitated by the primer ingredients, and not only retain their capacity for forming the composition into a paste but actually increase its sensitiveness to friction and percussion. These ingredients consist chiefly of the esters and ethers of starch, such as starch acetate, starch formate, starch propionate, starch glycolate, and ethyl starch. To increase the solubility of such starch esters and ethers a small quantity of methyl, ethyl or a higher alcohol, may be used. Such esters as starch acetate have been found to retain their colloidal character in priming compositions in which the usual gums such as gum arabic and gum tragacanth are precipitated and become entirely useless. Moreover, their use in certain compositions results in an actual increase in sensitiveness to percussion.

The explosive ingredients of priming compositions are frequently added to a dry mixture of the non-explosive ingredients in a moist condition. When this is done, the dry starch ester may be mixed with the other dry ingredients, and the moisture content of the explosive ingredients so regulated as to give the final mixture the proper consistency. The quantity of starch ester used is of the order of one percent by weight of the complete mixture. The starch ester may also be added in a water solution.

The present invention comprising the first discovery of the desirable properties of starch esters as priming composition bodying agents, the appended claims are to be broadly construed:

What is claimed is:

1. A priming composition comprising lead nitrate and a binder containing an ester of starch.

2. A priming composition comprising lead nitrate, and a binder containing an ingredient selected from the group consisting of the organic acid esters and ethers of starch.

3. A priming composition comprising lead nitrate and starch acetate.

JOHN F. HUTCHINSON.